United States Patent [19]

Israel et al.

[11] 4,355,206

[45] Oct. 19, 1982

[54] RINGING CONTROL DEVICE

[75] Inventors: Renato G. Israel, Versailles; Jean-Louis Lavoisard, Joinville-le-Pont, both of France; Jean-Claude Marchand, deceased, late of Saint Remy-les-Chevreuse, France, by Colette A. M. Marchand, legal representative

[73] Assignee: Societe Anonyme de Telecommunications, France

[21] Appl. No.: 133,871

[22] Filed: Mar. 25, 1980

[30] Foreign Application Priority Data

Mar. 30, 1979 [FR] France ................................ 79 07999

[51] Int. Cl.³ ............................................. H04M 3/02
[52] U.S. Cl. ............................... 179/18 HB; 179/18 J
[58] Field of Search ............... 179/18 HB, 18 J, 84 A, 179/84 R

[56] References Cited

U.S. PATENT DOCUMENTS

| 3,746,798 | 7/1973 | Thomas | 179/18 HB |
| 3,829,619 | 8/1974 | Close et al. | 179/18 HB |
| 3,978,293 | 8/1976 | Feiner | 179/18 HB |
| 4,081,613 | 3/1978 | Reines et al. | 179/18 J |
| 4,140,882 | 2/1979 | Regan et al. | 179/84 L |
| 4,201,897 | 5/1980 | Dorth et al. | 179/84 R |

Primary Examiner—Thomas W. Brown
Attorney, Agent, or Firm—Jacobs & Jacobs

[57] ABSTRACT

A ringing control device for a group of subscriber lines served by a connection network, comprising a relay for each line, the connection network providing a ringing control signal and a timing signal for controlling the relay, a ringing generator common to the group of lines and providing an A.C. ringing current to a line when the corresponding relay occupies a first position, a supervisory circuit for each line, connected thereto in the second position of the relay and delivering a signal to the connection network if the receiver is lifted while the relay occupies said second position, and a common off-hook condition detector delivering a signal if a D.C. current appears, due to the receiver being lifted, on at least one of the lines of the group while a ringing current is being fed (first position of the relay), wherein the ringing control device comprises an AND circuit receiving from the connection network the ringing control signal and the timing signal and connected to the supervisory circuit and to the off-hook condition detector and whose output signal controls the relay.

5 Claims, 6 Drawing Figures

RINGING CONTROL DEVICE

The present invention relates to a device for controlling ringing of a group of telephone subscriber lines connected to a connection network (electronic telephone exchange). When a subscriber line is called, a current must firstly be sent to actuate the ringing associated with this line after having verified that it is not in use and this ringing must then be stopped as soon as the receiver of the called line has been lifted, in order to avoid sending high level ringing signals into the receiver.

To this end, in heretofore known time switching systems, a circuit for detecting the presence of the D.C. current corresponding to the answer to a call and for stopping the ringing by which this call is manifested, was allocated to each line called. The utilization rate of this circuit was obviously very low and only enabled the answer to be detected during a non-ringing or silent period.

An improvement has been disclosed in French Pat. No. 2,290,805; according to this patent, a circuit for detecting the answer to a call during the ringing periods and for stopping the corresponding ringing operates in time-sharing for a limited number n of called lines by means of a ringing of which the active period of a duration of 1/n is offset for each line by a time 1/n.

Such a detector of the off-hook condition will be efficient only if the number n of called sets is very high; in the specification of said patent, this number n is taken to be equal to 4; the circuit for detecting the answer to a call and for stopping the corresponding ringing therefor has a better utilization rate, but the latter is not fully satisfactory.

Another system for detecting the off-hook condition of subscriber lines on the same group of subscriber lines is already known. It consists essentially in systematically testing all the subscriber lines during the ringing. In fact, a ringing signal is a periodic signal formed by a ringing time lasting 1.6 sec and a non-ringing or rest time lasting 3.3 sec. The systematic detection process of the prior art provides one or more systematic interruptions of ringing of duration close to 100 msec for all the subscriber lines. These interruptions occur at each period and cause disturbances of the ringing perceptible to the subscriber's ear.

Furthermore, French Pat. No. 2,382,818 provides a common off-hook condition detector for the whole group of subscriber lines. This common detector delivers a signal if the telephone receiver is lifted during ringing on at least one of the subscriber lines, which signal is sent to the connection network which then controls the stopping of the ringing on all the called lines. This stopping is then confirmed, for the line on which the telephone receiver was effectively lifted, by the supervisory circuit pertaining to each line.

This system has the drawback of using the central logic of the connection network and therefore of imposing an additional function thereon.

On the contrary, the invention starts from the principle that the ringing control device must be decentralized as much as possible in order to reduce the tasks of the connection network and to avoid transmissions of additional signals.

There is provided according to the present invention a ringing control device for a group of subscriber lines served by a connection network, comprising a relay for each line, the connection network providing a ringing control signal and a timing signal for controlling the relay, a ringing generator common to the group of lines and providing an A.C. ringing current to a line when the corresponding relay occupies a first position, a supervisory circuit for each line, connected thereto in the second position of the relay and delivering a signal to the connection network if the receiver is lifted whilst the relay occupies said second position and a common off-hook condition detector delivering a signal if a D.C. current appears, due to the receiver being lifted on at least one of the lines of the group while a ringing current is being fed (first position of the relay), wherein said ringing control device comprises an AND circuit, receiving from the connection network the ringing control signal and the timing signal and connected to the supervisory circuit and to the off-hook condition detector and whose output signal controls the relay.

The invention will be more readily understood on reading the following description with reference to the accompanying drawings, in which.

Figure 1:
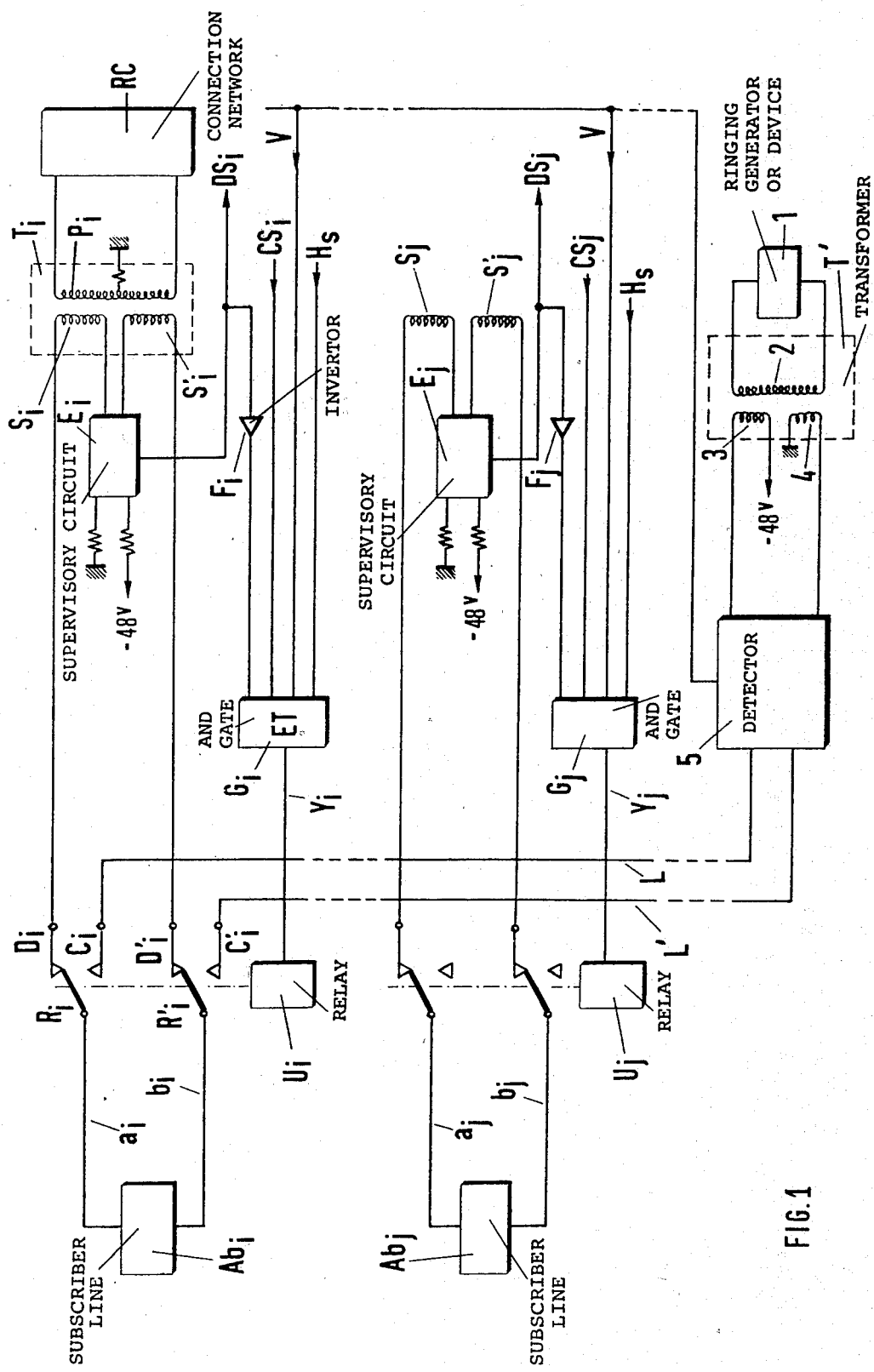
FIG. 1 is a general representation of the device of the invention.

Referring now to the drawings, FIG. 1 shows that n lines of subscribers $Ab_i$ (i=1,n) are each connected, by means of two leads $a_i$ and $b_i$, to a common line L, L' connecting them to the ringing generator 1. Each subscriber line ($a_i$, $b_i$) is connected to the line L, L' by means of the contacts $R_i$, $R'_i$ which are actuated by a relay $U_i$ as will be explained hereinafter. The contacts $R_i$ and $R'_i$ may thus be positioned either at $C_i$, $C'_i$ for the connection to the ringing device via the line L, L', or at $D_i$, $D'_i$ for connection to the connection network RC via a transformer $T_i$, this enabling the subscriber to receive the communication. The differential transformer $T_i$ is composed of a primary winding $P_i$ connected to the connection network RC and of two secondary windings $S_i$ and $S'_i$. The winding $S_i$ (or $S'_i$) is connected on the one hand to contact $D_i$ (or $D'_i$) of subscriber $Ab_i$ and on the other hand to a supervisory circuit $E_i$ which is connected on the one hand to ground and on the other hand to potential −48 volts. The supervisory circuit $E_i$ is capable of detecting the flow of a loop current if the subscriber $Ab_i$ lifts his receiver when the contacts $R_i$ and $R'_i$ are placed at $D_i$ and $D'_i$ (non ringing period). The device $E_i$ then produces a signal $DS_i$ indicative of the off-hook condition when the subscriber $Ab_i$ has lifted his receiver. This signal $DS_i$ is transmitted to a control device (not shown in the Figure) to prevent the ringing of the subscriber from being energized again during the communication.

The ringing device 1 furnishes an A.C. signal of frequency 25 Hz or 50 Hz to the terminals of a primary winding 2 of a transformer T'. The secondary winding of this transformer T' is composed of two windings 3 and 4. The winding 3 is connected on the one hand to the potential −48 V of a battery and on the other hand, by the line L common to the n subscribers, to the contacts $C_i$ (i=1,n). The winding 4 is connected on the one hand to ground at a point W and on the other hand is connected, via the common line L', to the contacts $C'_i$ (i=1,n).

A timing signal $H_s$ furnished by the connection network, of a period 5 sec, authorises a ringing state for 1.66 sec and a silence, or non-ringing state, of 3.33 sec. This signal $H_s$ is applied to the input of an AND gate $G_i$, for each subscriber, which gate $G_i$ also receives a ringing control signal $CS_i$ furnished by the control device (not shown). The states 1 of the timing signal $H_s$ correspond to ringing period whilst states O of the signal $H_s$ correspond to the non-ringing periods, or silences. The contacts $R_i$ and $R'_i$ of the subscriber $Ab_i$ are actuated by means of a relay $U_i$ which is controlled by a signal $Y_i$ obtained at the output of an AND gate ($G_i$). Each gate $G_i$ receives the signal $\overline{DS_i}$ obtained by inversion by means of an inverter $F_i$ from the signal $DS_i$, furnished by the supervisory circuit $E_i$ of the subscriber $Ab_i$. The signal $DS_i$, as was previously explained, is the loop state signal of the subscriber $Ab_i$ when its contacts $R_i$, $R'_i$ are respectively at $D_i$, $D'_i$. Each gate $G_i$ further receives the signals $DS_i$, $CS_i$ and $H_s$. The signal $Y_i$ obtained at the output of the gate $G_i$ is applied to the relay $U_i$ of the subscriber $Ab_i$. Consequently, if a call arrives for subscriber $Ab_i$, the relay $U_i$ positions the contacts $R_i$ and $R'_i$ during the ringing periods ($H_s=1$), in $C_i$ and $C'_i$ for the connection to the calling device which supplies an AC current on the line $a_i$, $b_i$ of the subscriber $Ab_i$ and repositions the contacts $R_i$ and $R'_i$, during the non-ringing periods $H_s=0$ in $D_i$ and $D'_i$.

If the subscriber lifted his telephone receiver during a ringing period, an A.C. ringing current would be fed into the receiver, which would be disagreeable and detrimental to the installation. It is therefore necessary to detect the off-hook condition of the receiver of called subscriber $Ab_i$ as quickly as possible, namely within 200 msec, even during a ringing period, and to avoid its return to service in the course of the following period of the timing signal $H_s$.

To this end, there is provided a device 5 making it possible to stop the ringing, for a group of subscribers, as soon as one of the receivers has been lifted.

Figure 2:
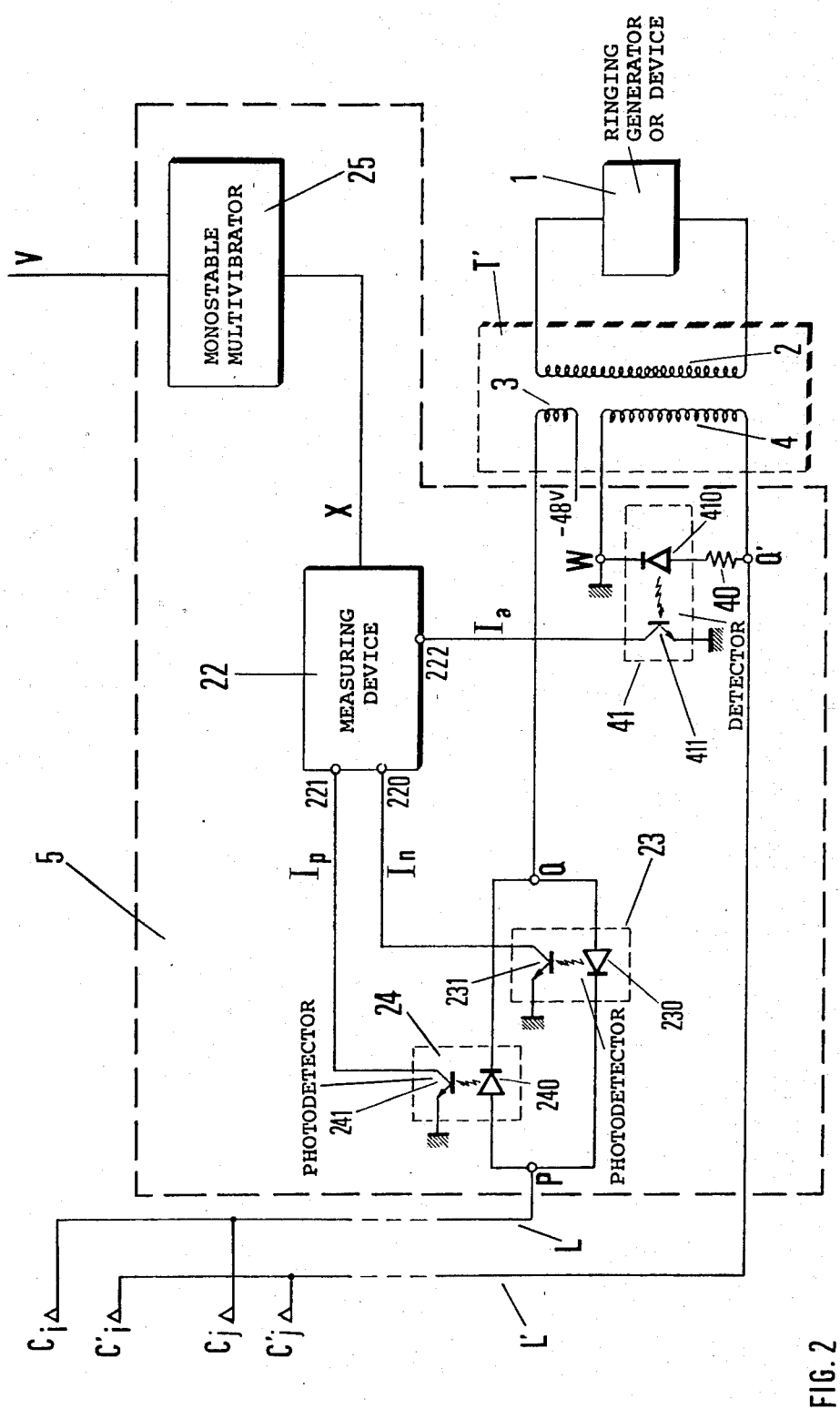
FIG. 2 shows in more detail the components 5, T' and 1 of FIG. 1.

Referring to FIG. 2, there is disposed at the output terminals of the secondary windings 3 and 4 of the transformer T' a detector 5 common to the group of n subscribers, i.e. on line L, L'. If the subscriber $Ab_i$ lifts his receiver following a call, a D.C. loop current flows on line L, L'. The detector 5 comprises means for almost instantaneously detecting the superposition of the D.C. loop current on the A.C. ringing current.

According to the invention, a resistor 40 and a photodetector 41 placed in series are disposed at the terminals of the secondary winding 4 of the transformer T', between point Q' of the line L' and point W connected to ground. The photodetector 41 is composed of a photodiode 410, which, under the effect of the passage of the current, produces a radiation which takes the base of the phototransistor 411 to a potential such that it becomes conductive. The emitter of the phototransistor 411 being connected to ground and its collector being connected to the terminal 222 of a measuring device 22, the photodetector 410 furnishes a current $I_a$ during a reference duration $d_o$ to the terminal 222 of the device 22, i.e. during the half-waves of the ringing current. Between two points P and Q of line L, at the output of the secondary winding 3, two photodetectors 23 and 24 placed inverted with respect to each other, are disposed in parallel. The photodetector 23 is composed of a photodiode 230 for example conductive from Q towards P which may produce a radiation on the base of a phototransistor 231 whose emitter is connected to ground and collector is connected to the gate 220 of the measuring device 22. In the same way, the photodetector 24 is composed of a photodiode 240, conductive from P towards Q which may activate the base of the phototransistor 241 whose emitter is also connected to ground and collector is connected to another input 221 of the measuring device 22.

Figure 3:
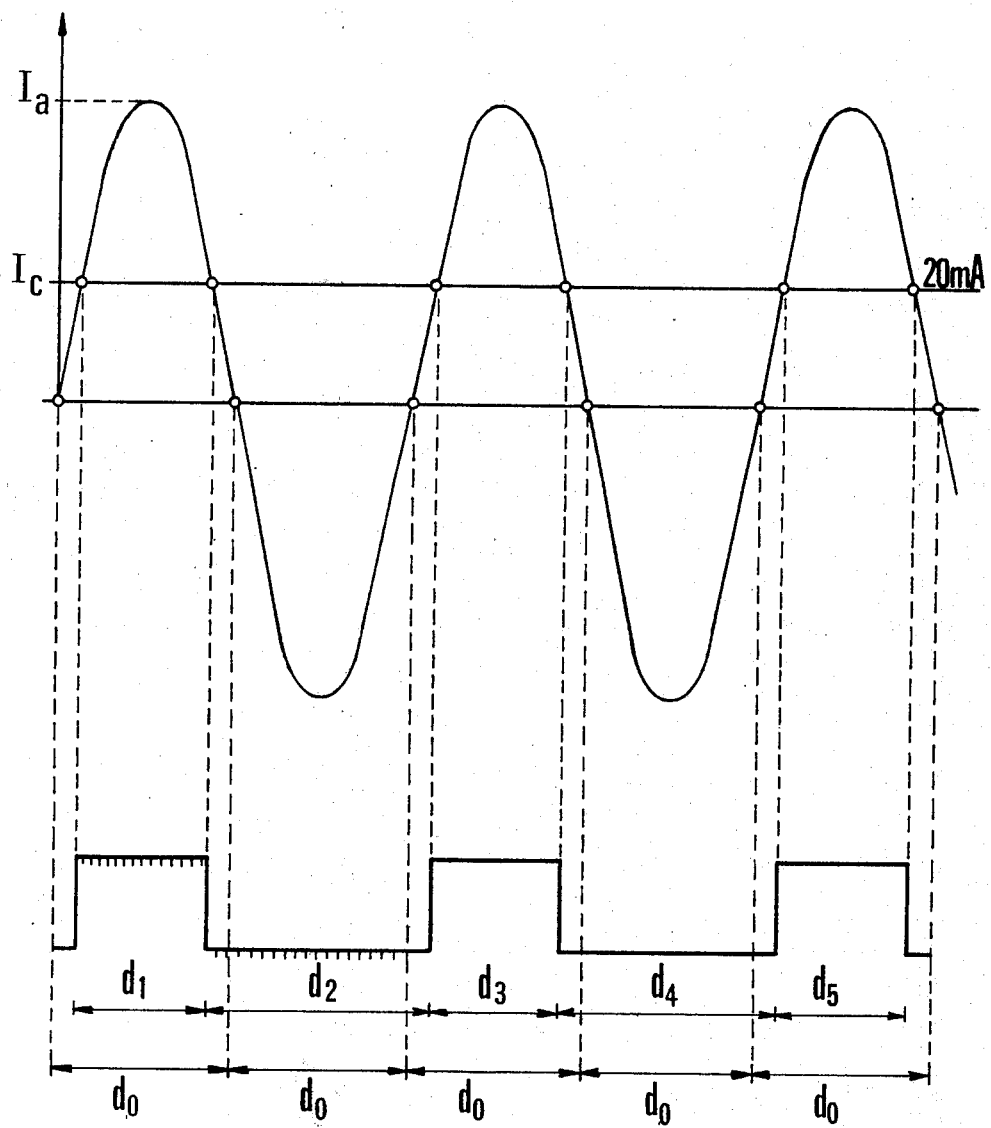
FIG. 3 illustrates the operation of the device 5 of FIG. 2.

The device 22 therefore receives on each input 220 and 221 alternately the current corresponding to the positive and negative alternations of the calling current. When the subscriber called has not lifted his receiver, there is equality of the durations of passage of the currents passing through each photodetector 23 and 24 to the respective inputs 220 and 221 of the device 22. However, when the called subscriber lifts his receiver further to a call, the D.C loop current is superposed on the ringing current as shown in FIG. 3.

The ringing current is a current of average effective value 50 mA whilst the loop current has an average value of the order of 30 mA. There is therefore an unbalance between the durations of passage of the currents received at the terminals 220 and 221 of the measuring device 22. In fact, the D.C. loop current of the subscriber who has lifted the receiver is superposed on an alternation and the durations of passage of the currents furnished by each photodetector 23 and 24 to the inputs 220 and 221 are different. If $d_1$, $d_3$, $d_5$ ... designate the duration of passage of a current on one photodetector and $d_2$, $d_4$, $d_6$ ... the duration of passage on the other photodetector, the durations $d_1$ and $d_2$ are different in the course of a period of the calling current. It is assumed in FIG. 3 that $d_2$ is greater than $d_1$. As the D.C. current is not totally stabilized from its production, it is necessary to measure the durations $d_3$, $d_4$, then $d_5$ and $d_6$ also, to take into account the phenomenon.

The measuring device 22 is capable of effecting the measurement of $(d_2-d_1)$ for each period of the calling signal and of comparing these magnitudes with the duration $d_o$ of a half wave of the calling signal in the absence of D.C. current. The measuring device 22 in fact also receives the calling signal at its terminal 222. A measuring device 33 known per se is chosen, capable of effecting the division $(d_2-d_1)/(d_0)$ and of comparing this magnitude with a suitably chosen ratio r. The device 22 effects this measurement for several periods of the calling signal and furnishes an output signal x only after a suitably chosen number p of measurements. Such a measuring device 22 may for example be a microprocessor.

The measuring device 22 thus effects a veritable differential measurement confirmed over several periods. It thus makes it possible to detect with safety small variations of the shape factor of the signals passing through each photodetector 23 and 24, such as those which result for example from a remote receiver being lifted (weak D.C. current), whilst a plurality of closer sets are simultaneously ringing (high A.C. current) and reliably furnishes a signal x indicative of the off-hook condition.

The signal x is a 1 if no subscriber has lifted his receiver and a 0 if a subscriber has lifted his receiver. The signal x is applied to the input of a monostable multivibrator 25 which furnishes at its output a signal V. This signal V becomes equal to 0 if a subscriber has lifted his receiver and becomes equal to 1 again after a suitable period of time.

Referring again to FIG. 1, the signal V furnished by the detector 5 of the invention is applied to the input of the n AND gates ($G_i$) ($1 \leq i \leq n$) of the n subscribers. Each gate $G_i$ also receives the ringing control signal $CS_i$ from the control members (not shown), the timing signal $H_s$ and finally the signal $DS_i$ inverted by means of the inverter $F_i$. If these four signals $\overline{DS_i}$, $H_s$, $CS_i$ and V are 1's, the signal $Y_i$ emitted by the gate $G_i$ is a 1 and the relay $U_i$ replaces the contacts $R_i$, $R'_i$ on the position $D_i$, $D'_i$. The state of the signal $Y_i$ may be summarised by $Y_i = \overline{DS_i} V H_s CS_i$.

Thus, at the end of a state 1 (ringing state) of the timing signal $H_s$, if the signals $\overline{DS_i}$ and V are still in state 1 (the subscriber has not yet lifted his receiver), the contacts $R_i$ and $R'_i$ are reconnected with the ringing generator 1 upon passage of the timing signal $H_s$ to state 0.

Figure 4:
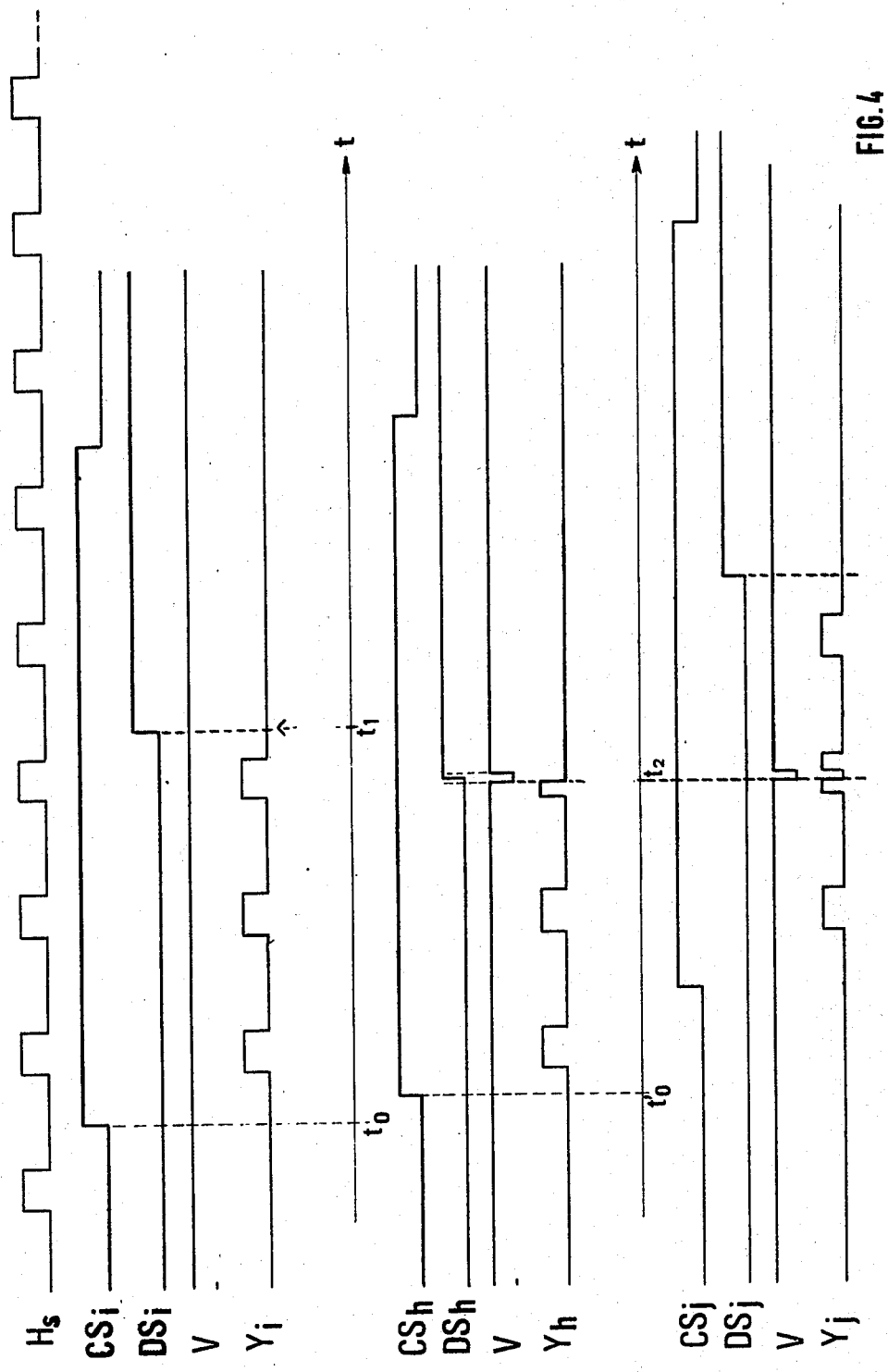
FIG. 4 is a timing chart during a ringing period for lines of subscribers $Ab_i$, $Ab_h$, $Ab_j$ in distinct states.

FIG. 4 explains the states, before and after the receiver is lifted, of signals $Y_i$, $Y_j$, $Y_h$, for three subscribers $Ab_i$, $Ab_j$, $Ab_h$.

Let us assume that subscriber line $Ab_i$ is called at instant $t_o$. The control device applies a ringing control signal $CS_i$ which passes to state 1 at time $t_o$. Let us assume that this subscriber $Ab_i$ lifts his receiver during a non-ringing or silent period. Supervisory circuit $E_i$ furnishes a signal $DS_i$ which is transmitted on the one hand to the control device and on the other hand, after inversion by means of the inverter $F_i$, to the input of the AND gate ($G_i$). The signal $\overline{DS_i}$ maintains the signal $Y_i$ in state O, and the relay $U_i$ will not be actuated during the following ringing period.

Let us assume that subscriber $Ab_h$ is called at instant $t'_o$. The signal $CS_h$ passes to state 1 at time $t'_o$. Let us assume that subscriber $Ab_h$ lifts his receiver at an instant $t_2$ which corresponds to a ringing period ($H_s=1$). In the absence of signal V the subscriber $Ab_h$ would receive in his receiver a high level signal which would be highly disagreeable for him and detrimental to his receiver. However, the signal V furnished by the device 5 detecting the lifting of the receiver replaces the signal $Y_h$ in state 0, switches the subscriber $Ab_h$ onto his supervisory circuit for a time equal to the width of the pulse V=0. The duration during which V is equal to 0, which invalidates the ringing signal, is obtained by a suitable adjustment of the monostable multivibrator 25 of the detector device 5. This duration is calculated so that it allows the fading of the transitory phenomena on the lines and more particularly the interferences due to the cut-off of ringing to disappear from the line $a_h$, $b_h$ of the subscriber $Ab_h$. This duration during which V is equal to 0 is advantageously chosen to be of the order of 80 ms. As this subscriber $Ab_h$ is, during this duration, on his supervisory circuit $E_h$, the latter generates a signal $DS_h$ which subsequently maintains the signal $Y_h$ in state 0.

The third subscriber $Ab_j$ has been called by means of signal $CS_j$ from the control device, but has not yet lifted his receiver at time $t_2$ when the subscriber $Ab_h$ lifts his receiver. The signal V generated by the device 5, common to the group of n subscribers, therefore also invalidates the call for subscriber $Ab_j$ (the signal $Y_j$ passes to state 0 for as long as V equals 0). As he has not lifted his receiver when the signal V passes to state 1 again, and as his ringing control signal CS remains in state 1, the subscriber $Ab_j$ is again connected to the ringing generator 1 at the same time as the subsequent ringing periods ($H_s=1$). The subscriber $Ab_j$ has thus undergone only a brief interruption during a ringing period. It has been assumed in FIG. 4 that this subscriber $Ab_j$ subsequently lifts his receiver in the course of a non-ringing period; this is the case of subscriber $Ab_i$, therefore it is by the action of signal $DS_j$ that the ringing stops. However, it would also be possible for subscriber $Ab_j$ to lift his receiver during a ringing period; one would return to the case of subscriber $Ab_h$ for whom the ringing stops by intervention of signal V then by action of the signal $DS_h$.

Figure 5:
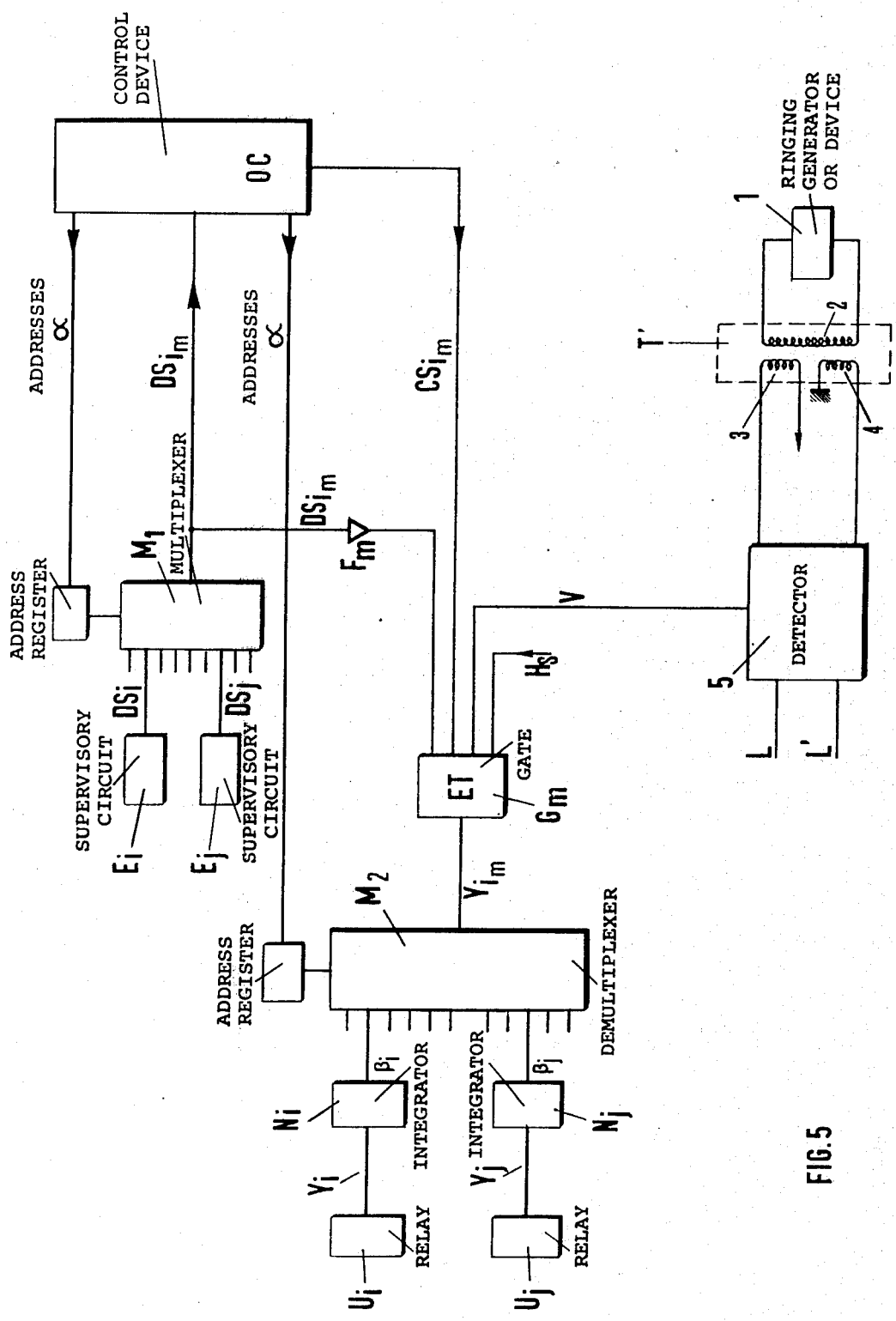
FIG. 5 is a diagram of an alternative preferred embodiment of the device generally shown in FIG. 1.

FIG. 5 illustrates a preferred embodiment of the invention. A first multiplexer $M_i$ receives the n signals $DS_i$ ($1 \leq i \leq n$) furnished by n supervisory circuits $E_i$, and multiplexes them in accordance with the addresses $\alpha$ furnished by the control device OC. The signal $DS_{im}$ furnished by the multiplexer $M_1$ is inverted by means of the inverter $F_m$ and the signal $\overline{DS_{im}}$ thus obtained is applied to the input of an AND gate $G_m$. This gate $G_m$ also receives the ringing timing signal $H_s$, the signal V furnished by the detector 5 indicative of the lifting of the receiver of at least one subscriber during a ringing period, and finally the multiplexed ringing control signal $CS_{im}$ from the control device OC. A signal $Y_{im}$ is furnished by the gate $G_m$ and is applied to the input of a demultiplexer $M_2$ which furnishes n signals $\beta_i$ in accordance with the addresses $\alpha$ furnished by the control member OC. The n signals $\beta_i$ are each integrated by means of integrators $N_i$ which each supply at the output a signal $Y_i$ for controlling the corresponding relay $U_i$. This relay $U_i$ controls the connection of the subscriber to the ringing generator 1 as was previously explained.

Figure 6:
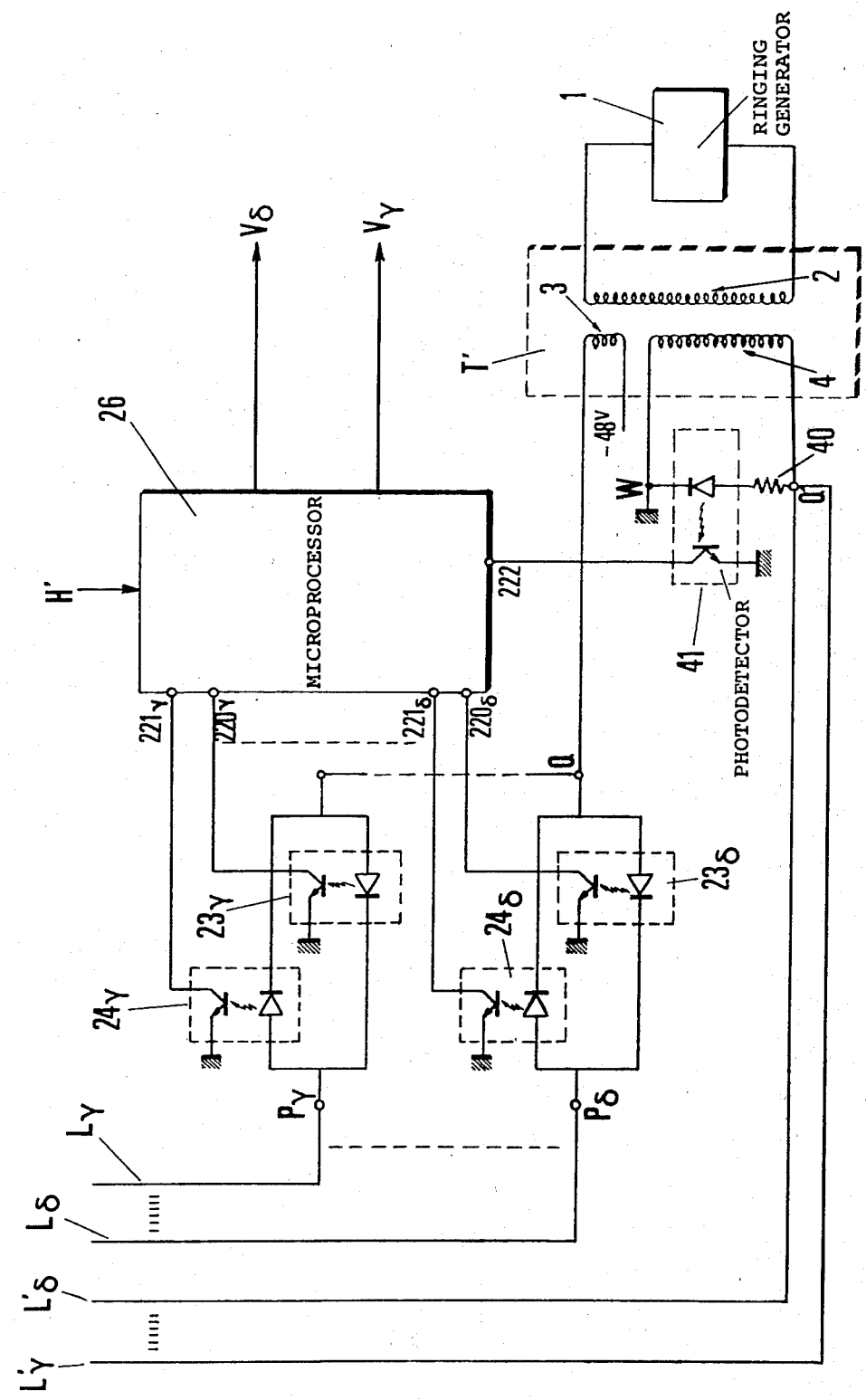
FIG. 6 shows a modified embodiment of FIG. 2.

FIG. 6 shows a modified embodiment of the off-hook condition detection device according to FIG. 2. The measuring device 22 is replaced by a microprocessor 26 common to m groups of n subscribers. The microprocessor operates in time sharing for m groups of two photodetectors 23 and 24. As has previously been described by means of FIG. 2, there is therefore disposed between points W and Q' of the winding 4 transmitting the call signal a photodetector 41 placed in series with a resistor 40 which furnishes a current of one alternation out of two to input 322 of the microprocessor 26. The m lines $L'_j$ of the m groups of subscribers are connected at Q' and at Q, the m groups of photodetectors $23_j$ and $24_j$ mounted inverted with respect to each other which are themselves connected at $P\delta$ to the line $L\delta$ of the group $\delta$ taken from the m groups of n subscribers. To this end, the microprocessor 26 effects the measurement in time sharing for each group taken from the m groups, each time slot allocated to a group being regulated by means of a clock signal H'. The gates $221_\delta$ and $220_\delta$ receive, as has been explained in FIG. 2, the signals indicative of the receiver being lifted. The microprocessor 26 effects the measurement $(d_2-d_i)/(d_0)$ for each group $\delta$ and in addition furnishes an output pulse $V\delta$ of predetermined width in the same way as that furnished at the output of the monostable multivibrator 25 of FIG. 2.

Thus, the device according to the invention for stopping ringing may be common to n subscribers or even to mxn subscribers and is virtually instantaneously effective. It is operative only when a subscriber has lifted his receiver during a ringing period. The greater the number of subscribers, the greater the probability of disturbences of the ringing periods will be. However, a simple statistic calculation shows that for 32 subscribers, only one ringing stop is produced every thousand calls, i.e. only one disturbance per year occurs for a subscriber with a moderate number of communications. The device according to the invention is therefore extremely economical since it avoids the systematic stops for all the subscribers during all the ringing states, and allows the rapid detection of a receiver being lifted, with a reduced amount of equipment.

It should further be pointed out that the device for measuring the ratio $(d_2-d_i)/(d_0)$ is a digital device and hence is superior with respect to processing time and operates irrespective of the frequencies involved.

What we claimed is:

1. A ringing control device for a group of subscriber lines served by a connection network, comprising a relay for each line, the connection network providing a ringing control signal and a timing signal for controlling the relay, a ringing generator common to the group of lines and providing an A.C. ringing current to a line when the corresponding relay occupies a first position, a supervisory circuit for each line, connected thereto in the second position of the relay and delivering a signal to the connection network if the receiver is lifted whilst the relay occupies said second position, and a common off-hook condition detector delivering a signal if a D.C. current appears, due to the receiver being lifted, on at least one of the lines of the group while a ringing current is being fed (first position of the relay), wherein the ringing control device comprises AND means receiving from the connection network the ringing control signal and the timing signal and connected to the supervisory circuit and to the off-hook condition detector and whose output signal controls the relay.

2. The device of claim 1, including a multiplexer receiving all the signals produced by the supervisory circuits and having its output connected to said AND means which receives from the connection network a multiplexed signal including the ringing control signals of the group of lines, and a demultiplexer connected to the output of said AND means and delivering output signals for controlling the relays.

3. The device of claim 1, wherein the common off-hook condition detector comprises at its output a monostable multivibrator which produces a signal of predetermined duration.

4. The device of claim 3, wherein the common off-hook condition detector comprises two photocouplers mounted in parallel and inverted with respect to each other between the ringing generator and the group of subscriber lines and providing signals corresponding respectively to the positive and negative alternations of the current applied, a third photocoupler receiving the A.C. current produced by the ringing generator and providing a reference signal, and a measuring device receiving the signals from the two photocouplers and the reference signal and delivering to the monostable multivibrator a signal when the division $(d_2-d_1)/(d_o)$ exceeds a determined value, $d_1$ and $d_2$ standing for the duration of the positive and negative alternations of the current applied to the two photocouplers and $d_o$ the duration of an alternation of said A.C. current.

5. The device of claim 4, wherein the measuring device is a digital device.

* * * * *